(12) United States Patent
Choi et al.

(10) Patent No.: US 9,001,779 B2
(45) Date of Patent: Apr. 7, 2015

(54) METHOD FOR TRANSMITTING PILOT SIGNAL FOR MACHINE TO MACHINE COMMUNICATION IN WIRELESS COMMUNICATION SYSTEM AND APPARATUS THEREOF

(75) Inventors: Jinsoo Choi, Anyang-si (KR); Hangyu Cho, Anyang-si (KR)

(73) Assignee: LG Electronics Inc., Seoul (KR)

( * ) Notice: Subject to any disclaimer, the term of this patent is extended or adjusted under 35 U.S.C. 154(b) by 294 days.

(21) Appl. No.: 13/582,262

(22) PCT Filed: Apr. 18, 2011

(86) PCT No.: PCT/KR2011/002750
§ 371 (c)(1),
(2), (4) Date: Aug. 31, 2012

(87) PCT Pub. No.: WO2011/132896
PCT Pub. Date: Oct. 27, 2011

(65) Prior Publication Data
US 2013/0003694 A1 Jan. 3, 2013

Related U.S. Application Data

(60) Provisional application No. 61/326,238, filed on Apr. 21, 2010, provisional application No. 61/417,232, filed on Nov. 25, 2010.

(51) Int. Cl.
*H04W 4/00* (2009.01)
*H04W 48/08* (2009.01)
*H04W 72/04* (2009.01)
*H04W 92/18* (2009.01)

(52) U.S. Cl.
CPC .............. *H04W 48/08* (2013.01); *H04W 72/04* (2013.01); *H04W 92/18* (2013.01)

(58) Field of Classification Search
USPC ......................................................... 370/330
See application file for complete search history.

(56) References Cited

U.S. PATENT DOCUMENTS

| | | | |
|---|---|---|---|
| 2008/0108369 A1* | 5/2008 | Visotsky et al. | 455/455 |
| 2009/0225888 A1* | 9/2009 | Noh et al. | 375/267 |
| 2009/0247172 A1 | 10/2009 | Palanki et al. | |
| 2009/0285173 A1 | 11/2009 | Koorapaty et al. | |

(Continued)

OTHER PUBLICATIONS

Alcatel-Lucent, "M2M Communication," 3GPP TSG-RAN-WGl Meeting #54bis, RI—083850 (Aug. 29, 2008).*

(Continued)

*Primary Examiner* — Brian Roberts
*Assistant Examiner* — Shah R Zaman
(74) *Attorney, Agent, or Firm* — Birch, Stewart, Kolasch & Birch, LLP

(57) ABSTRACT

A method for transmitting a pilot signal for machine to machine (M2M) communication in a wireless communication system and an apparatus thereof are disclosed. The method comprises the steps of configuring a basic unit including a plurality of pilot resource elements (REs) and data resource elements; allocating pilot signal to the plurality of pilot resource elements to the basic unit; and transmitting the basic unit to a receiver in a subframe unit in accordance with a rule which is previously defined, wherein the resource elements are time-frequency resources defined by one symbol index and one subcarrier index, and the basic unit is transmitted at a subframe except for a subframe at which a control channel is transmitted.

6 Claims, 16 Drawing Sheets

(56) References Cited

U.S. PATENT DOCUMENTS

| | | | |
|---|---|---|---|
| 2010/0177723 A1* | 7/2010 | Kim et al. | 370/329 |
| 2010/0278221 A1* | 11/2010 | Ql et al. | 375/219 |
| 2010/0284388 A1* | 11/2010 | Fantini et al. | 370/338 |
| 2011/0194551 A1* | 8/2011 | Lee et al. | 370/342 |
| 2011/0310769 A1* | 12/2011 | Lee et al. | 370/254 |

OTHER PUBLICATIONS

Alcatel-Lucent, "M2M Communication," 3GPP TSG-RAN-WG1 Meeting #54bis, Sep. 29-Oct. 3, 2008, R1-083850, 7 pages.

* cited by examiner (a)        (b)

(a)　　　　　　　　　　　　　　　(b)

(a)                  (b)

1 stream pilot    2 stream pilot

METHOD FOR TRANSMITTING PILOT SIGNAL FOR MACHINE TO MACHINE COMMUNICATION IN WIRELESS COMMUNICATION SYSTEM AND APPARATUS THEREOF

This application is the National Phase of PCT/KR2011/002750 filed on Apr. 18, 2011, which claims priority under 35 U.S.C. 119(e) to U.S. Provisional Application No. 61/326,238 filed on Apr. 21, 2010 and 61/417,232 filed on Nov. 25, 2010, all of which are hereby expressly incorporated by reference into the present application.

TECHNICAL FIELD

The present invention relates to a wireless communication system, and more particularly, to a method for transmitting a pilot signal for machine to machine (M2M) communication in a wireless communication system and an apparatus thereof.

BACKGROUND ART

FIG. 1 is a diagram illustrating a wireless communication system. Referring to FIG. 1, a wireless communication system 100 includes a plurality of base stations 110 and a plurality of mobile stations 120. The wireless communication system 100 can include homogeneous networks or heterogeneous networks. In this case, heterogeneous networks refer to networks in which different network entities coexist, such as IEEE (Institute of Electrical and Electronics Engineers) 802.16e system, IEEE 802.16m system, 3GPP LTE (Long Term Evolution) system, and WIFI system. Also, the homogeneous networks can be classified from a macro cell, a femto cell, a pico cell, and a relay station. The base stations are fixed stations that perform communication with mobile stations. Each of the base stations 110a, 110b, and 110c provides services to specific geographical area 102a, 102b or 102c. In order to improve system throughput, the specific area may further be divided into a plurality of smaller areas 104a, 104b and 104c. These smaller areas may be called cells, sectors or segments. In the IEEE 802.16 system, cell Identity (ID) (Cell_ID or IDCell) is assigned based on the whole system, whereas sector ID or segment ID is assigned based on a specific area within the range of service coverage of each base station, and has a value from 0 to 2. The mobile station 120, which is mobile or fixed, is generally distributed over the wireless communication system. Each mobile station may perform communication with at least one base station on a downlink and an uplink at a point of time. The communication may be performed between the base station and the mobile station through Frequency Division Multiple Access (FDMA), Time Division Multiple Access (TDMA), Code Division Multiple Access (CDMA), Single Carrier-FDMA (SC-FDMA), Multi Carrier-FDMA (MC-FDMA), Orthogonal Frequency Division Multiple Access (OFDMA), or a combination of them. In this specification, a downlink refers to a communication link directed from a base station to the mobile station and an uplink refers to a communication link directed from the mobile station to the base station.

DISCLOSURE OF INVENTION

Technical Problem

Accordingly, the present invention has been devised substantially obviate one or more problems due to limitations and disadvantages of the related art.

An object of the present invention is to provide a method for transmitting a pilot signal for machine to machine (M2M) communication in a wireless communication system and an apparatus thereof.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

Solution to Problem

To achieve these objects and other advantages and in accordance with the purpose of the invention, as embodied and broadly described herein, a method for transmitting a pilot signal for machine to machine (M2M) communication from a transmitter in a wireless communication system comprises the steps of configuring a basic unit including a plurality of pilot resource elements (REs) and data resource elements; allocating pilot signal to the plurality of pilot resource elements to the basic unit; and transmitting the basic unit to a receiver in a subframe unit in accordance with a rule which is previously defined, wherein the resource elements are time-frequency resources defined by one symbol index and one subcarrier index, and the basic unit is transmitted at a subframe except for a subframe at which a control channel is transmitted.

In this case, information on the subframe at which the basic unit is transmitted is signaled to the transmitter and the receiver by an M2M server.

Preferably, the step of allocating the pilot signal to the pilot resource elements includes the step of excluding a specific number of pilot resource elements from the plurality of pilot resource elements included in the basic unit. In this case, the step of transmitting the basic unit includes transmitting the basic unit through a frequency band configured for the M2M communication or shifting the pilot resource elements included in the basic unit per a subframe unit.

More preferably, the step of transmitting the basic unit includes the step of transmitting the pilot resource elements included in the even numbered symbol of the pilot resource elements configured in the basic unit at the even numbered subframe and the pilot resource elements included in the odd numbered symbol at the odd numbered subframe.

In another aspect of the present invention, a mobile station for machine to machine (M2M) communication in a wireless communication system comprises a processor configuring a basic unit including a plurality of pilot resource elements (REs) and data resource elements, and allocating pilot signal to the plurality of pilot resource elements in the basic unit; and a transmitting module transmitting the basic unit to a receiver in a subframe unit in accordance with a rule which is previously defined, wherein the resource elements are time-frequency resources defined by one symbol index and one subcarrier index, and the transmitting module transmits the basic unit at a subframe at which a control channel is not transmitted.

Preferably, the processor excludes a specific number of pilot resource elements from the plurality of pilot resource elements included in the basic unit. In this case, the transmitting module transmits the basic unit through a frequency band configured for the M2M communication, or the processor shifts the pilot resource elements included in the basic unit in a subframe unit.

More preferably, the transmitting module transmits the pilot resource elements included in the even numbered symbol of the pilot resource elements configured in the basic unit at the even numbered subframe and the pilot resource elements included in the odd numbered symbol at the odd numbered subframe.

Advantageous Effects of Invention

According to the embodiments of the present invention, the mobile station in the wireless communication system can effectively transmit a pilot signal for M2M communication.

It is to be understood that the advantages that can be obtained by the present invention are not limited to the aforementioned advantages and other advantages which are not mentioned will be apparent from the following description to the person with an ordinary skill in the art to which the present invention pertains.

BRIEF DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention. In the drawings.

MODE FOR THE INVENTION

Hereinafter, the preferred embodiments of the present invention will be described with reference to the accompanying drawings. It is to be understood that the detailed description, which will be disclosed along with the accompanying drawings, is intended to describe the exemplary embodiments of the present invention, and is not intended to describe a unique embodiment with which the present invention can be carried out. The following detailed description includes detailed matters to provide full understanding of the present invention. However, it will be apparent to those skilled in the art that the present invention can be carried out without the detailed matters. For example, although the following description will be made based on a mobile communication system corresponding to an IEEE 802.16 system, the following description can be applied to other mobile communication systems except unique features of the IEEE 802.16 system.

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

In the following description, it is assumed that a mobile station designates a mobile or fixed type user terminal such as a user equipment (UE) and an advanced mobile station (AMS). It is also assumed that a base station designates a random node of a network node, such as Node B, and eNode B, which performs communication with the mobile station.

Figure 1:
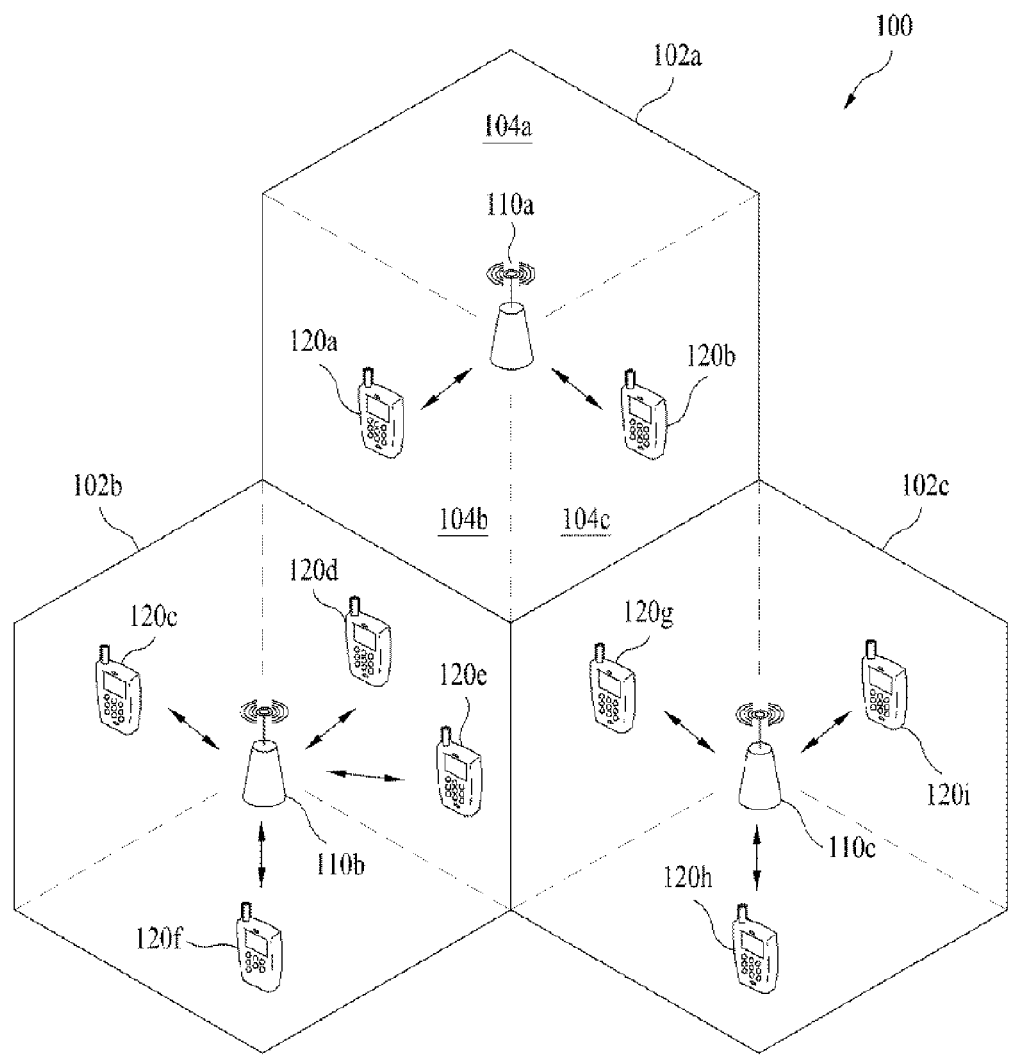
FIG. 1 is a diagram illustrating a wireless communication system.
Figure 2:
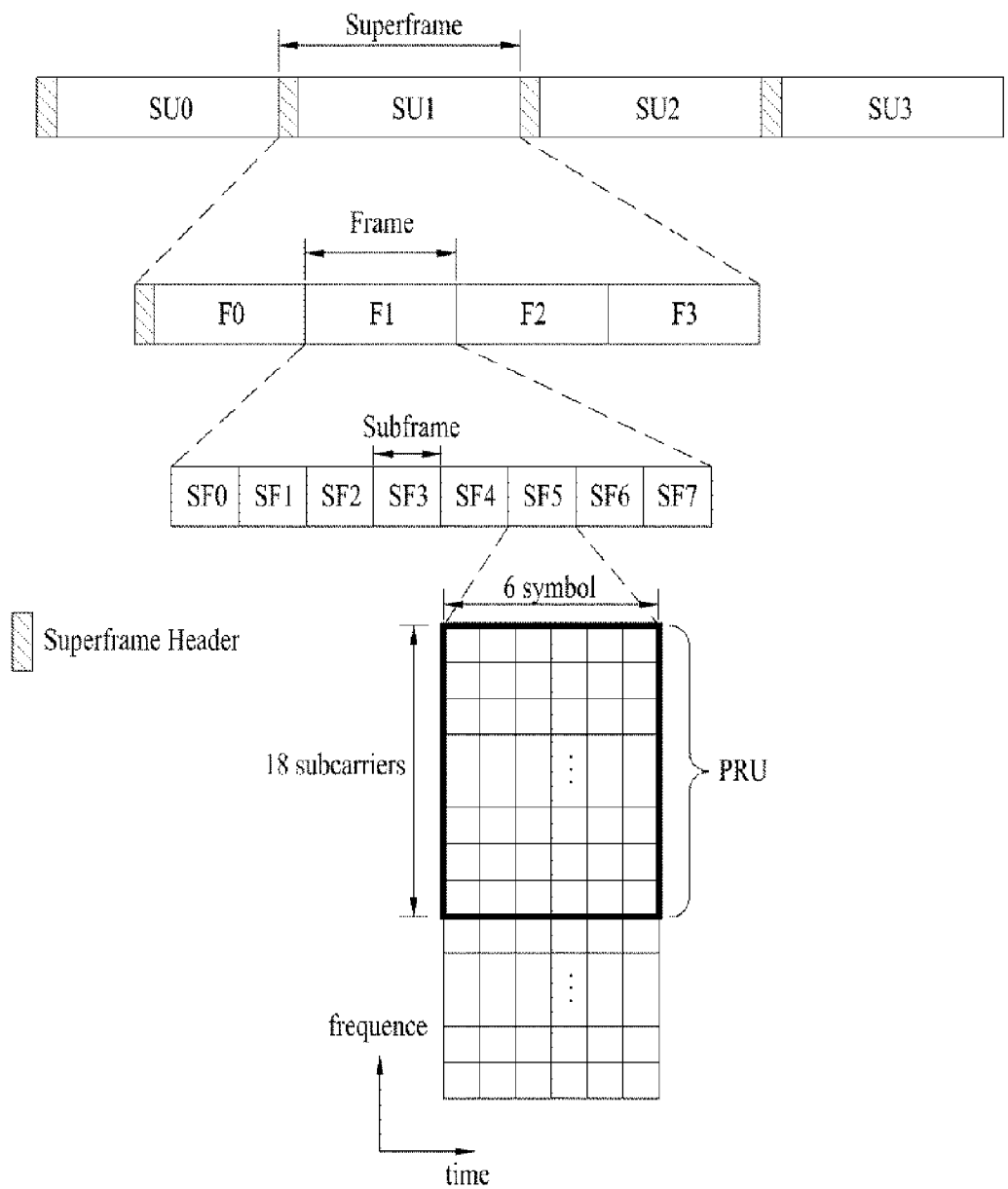
FIG. 2 is a diagram illustrating an example of a radio frame structure of an IEEE 802.16m system.

FIG. 2 is a diagram illustrating an example of a radio frame structure of an IEEE 802.16m system.

Referring to FIG. 2, the radio frame includes superframes SU0 to SU3 of 20 ms that support a bandwidth of 5 MHz, 8.75 MHz, 10 MHz or 20 MHz. Each superframe includes four frames F0 to F3 of 5 ms having the same size, and starts with a super frame header (SFH). The super frame header carries essential system parameter and system configuration information.

One frame can include eight subframes SF0 to SF7. Each subframe is allocated for downlink or uplink transmission. Each subframe includes a plurality of OFDM symbols in a time domain and a plurality of subcarriers in a frequency domain. The OFDM symbols may be referred to as OFDMA symbols or SC-FDMA symbols depending on a multiplexing access mode. The number of OFDM symbols included in one subframe can be varied depending on channel bandwidth and cyclic prefix (CP) length.

A type of the subframe can be defined depending on the number of OFDM symbols included in the subframe. For example, the type of the subframe can be defined in such a manner that subframe type-1 includes six OFDM symbols, subframe type-2 includes seven OFDM symbols, subframe type-3 includes five OFDM symbols, and subframe type-4 includes nine OFDM symbols. One frame may include the same type subframes or different types of subframes.

In particular, type-4 subframe that includes nine OFDM symbols is applied to only an uplink subframe that supports WirelessMAN-OFDMA frame of a channel bandwidth of 8.75 MHz.

FIG. 3 to FIG. 6 are diagrams illustrating pilot patterns based on the number of data streams in an IEEE 802.16m system. Particularly, in FIG. 3 to FIG. 6, pilot and data carriers designate resource elements (REs) to which pilot and data are respectively allocated. Each RE indicates time-frequency resources defined by one OFDM(A) symbol and one subcarrier. In this specification, "pilot (sub)carrier" and "data (sub) carrier" can be referred to as "pilot RE" and "data RE", respectively. Also, in FIG. 3 to FIG. 6, a subframe which is a basic resource unit for transmitting a pilot signal includes 18 subcarriers×6 OFDM(A) symbols, and a number listed in the pilot RE means index of a logical antenna port.

Figure 3:
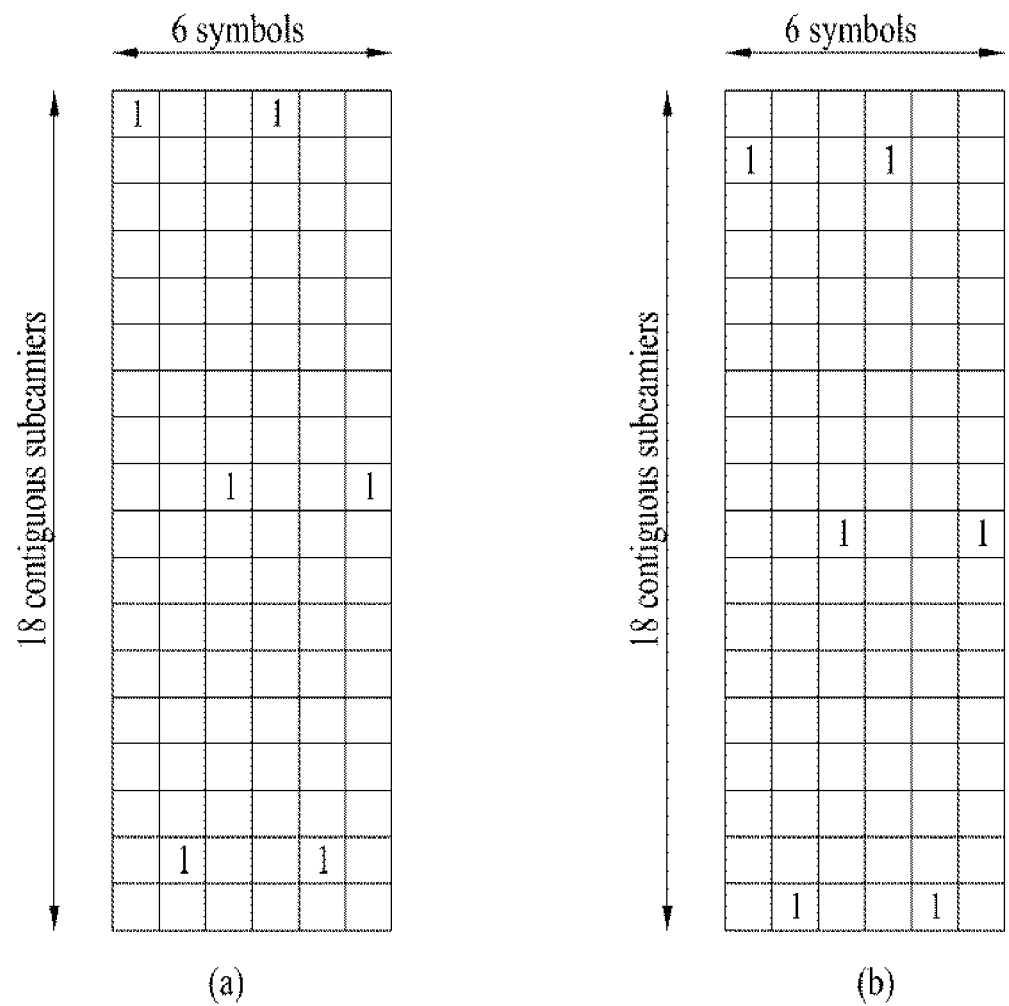
FIG. 3 to FIG. 6 are diagrams illustrating pilot patterns based on the number of data streams in an IEEE 802.16m system.
Figure 4:
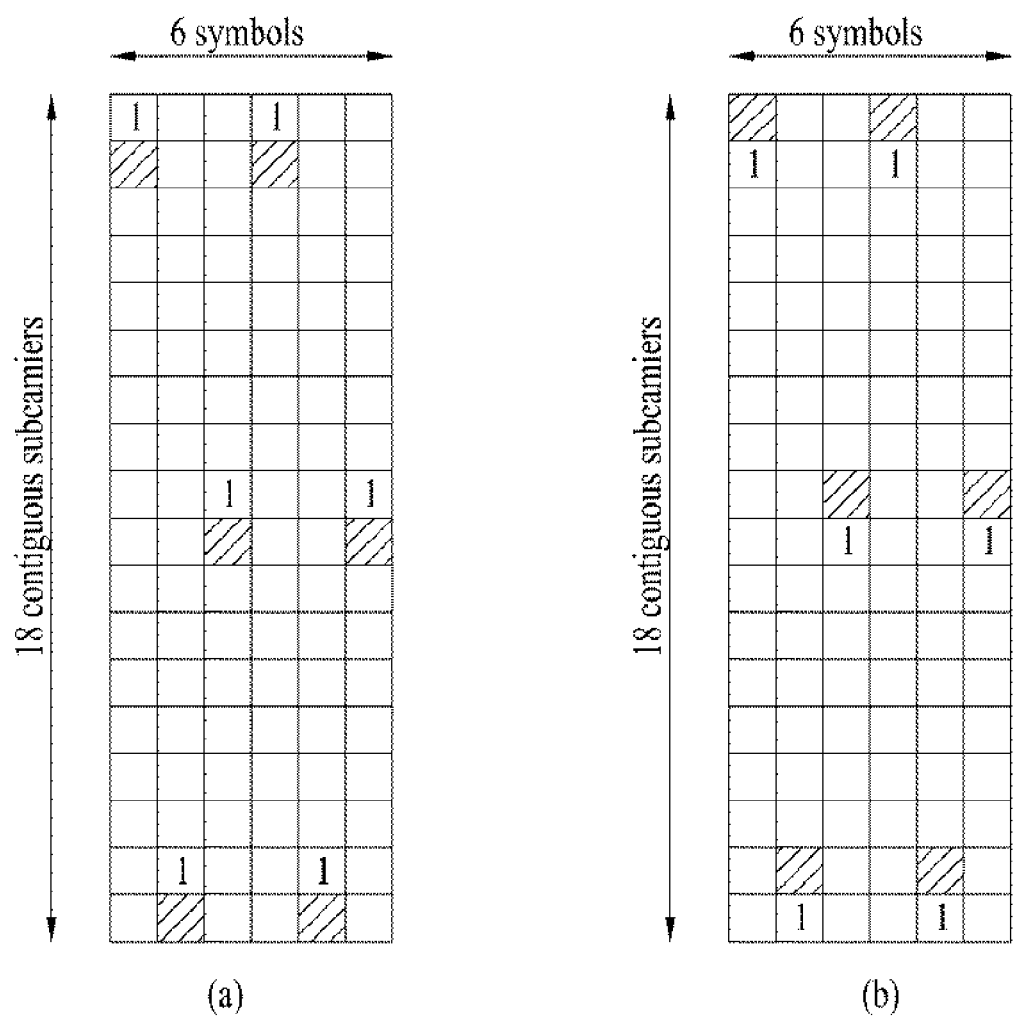
Figure 5:
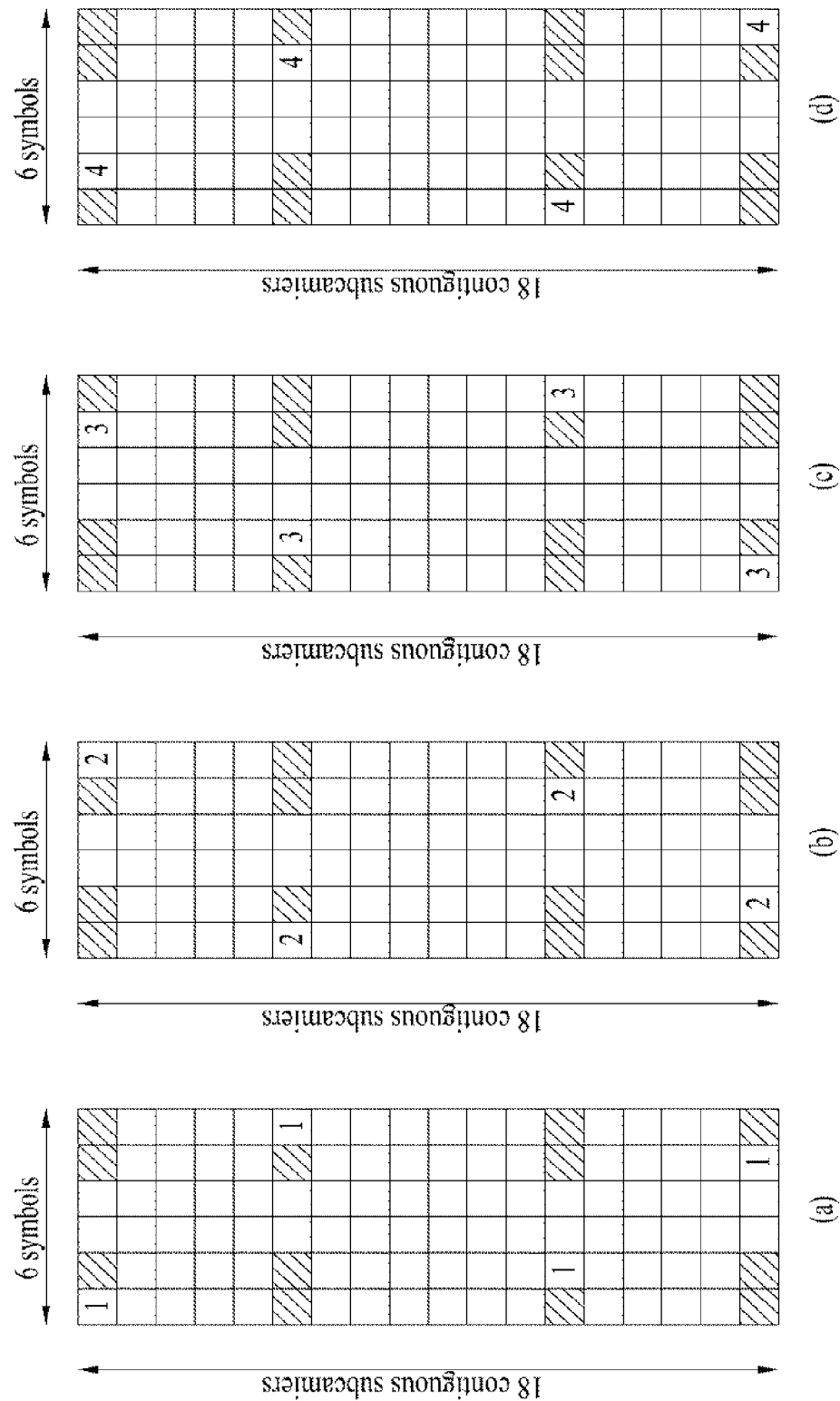
Figure 6:
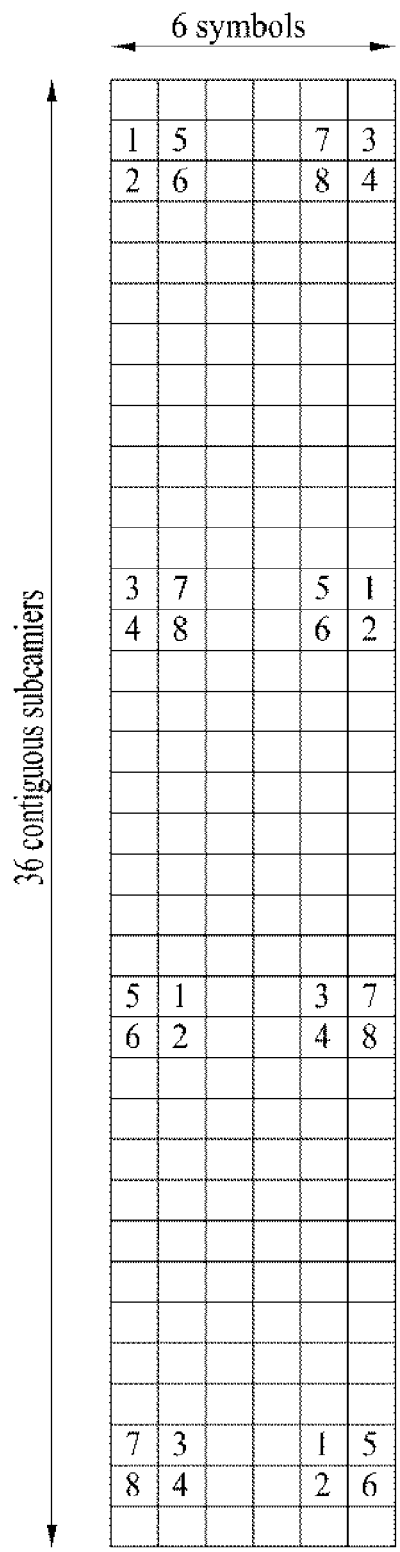

(a) of FIG. 3 and (b) of FIG. 3 are exemplary views illustrating that 1 Tx or 1 stream pilot is allocated, and (a) of FIG. 4 and (b) of FIG. 4 are exemplary views illustrating that 2 Tx or 2 stream pilot is allocated. Likewise, (a) of FIG. 5 and (b) of FIG. 5 are exemplary views illustrating that 4 Tx or 4 stream pilot is allocated, and FIG. 6 is an exemplary views illustrating that 8 Tx or 8 stream pilot is allocated.

Meanwhile, communication between neighboring mobile stations can generally be defined as peer-to-peer type communication. In the peer-to-peer type communication, a random access mode between communication entities is defined, wherein the communication entities perform communication in accordance with a rule. And, it is not considered whether the communication entity is connected with a public Internet network.

On the other hand, communication in a cellular network such as IEEE 802.16m system is necessarily defined as communication between a base station or its equivalent entity and a mobile station. In this case, all communication actions are controlled by the base station or its equivalent entity. For example, the base station controls all actions of the mobile station, such as data transmission power of the mobile station. In other words, the cellular network controls all actions of the mobile station in accordance with a certain rule, thereby obtaining maximum throughput. However, this rule may not be efficient depending on application or channel status of the mobile station. For example, when the channel status of the mobile station is not good, it is restricted to use an optimized communication path by searching a new access path.

Figure 7:
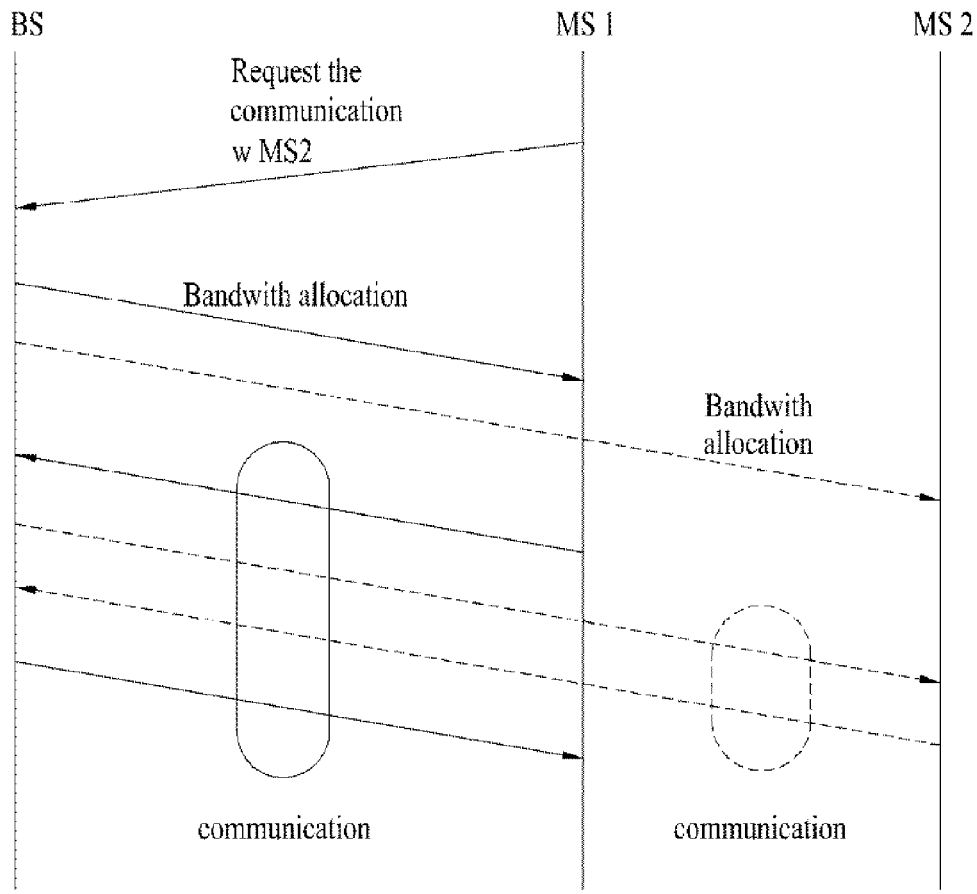
FIG. 7 is a diagram illustrating an example of a communication mode in an existing communication system.

FIG. 7 is a diagram illustrating an example of a communication mode in an existing communication system. As illustrated in FIG. 7, the mobile station 1 requests the base station of communication with the mobile station 2. Then, the base station allocates uplink and downlink resources to the mobile station 1 and the mobile station 2. Afterwards, each of the mobile station 1 and the mobile station 2 performs communication with the base station. Also, the mobile station 1 and the mobile station 2 can perform mutual communication through the base station.

Communication time and communication order of the mobile station 1 and the mobile station 2 with the base station, uplink and downlink of the mobile station 1 and the mobile station 2, etc. are briefly illustrated in FIG. 7, and may be varied depending on scheduling of the base station, the status of each mobile station, a transmission rate of each mobile station, etc. The procedure of FIG. 7 is briefly illustrated, and signals such as additional control information and measurement information can be transmitted and received between the mobile station and the base station. In the existing communication system of FIG. 7, communication between the mobile stations is always performed through the base station.

In general, path loss or propagation loss occurring during transmission is increased if the distance becomes longer. In order to reduce path loss or propagation loss, a transmitter should transmit a signal with a higher power. Accordingly, even in the case that a specific mobile station needs communication with a mobile station located to be closer to the specific mobile station than the base station or having a good channel status, the transmitter should transmit a signal with a higher power to perform communication through the base station. In this case, problems occur in that battery consumption of the mobile station is increased and the base station performs unnecessary transmission and reception such as simple forwarding. Since a cell having a radius of maximum 100 km is considered in a wireless communication system such as 3GPP LTE and IEEE P802.16m, these problems occur more seriously. Also, the existing communication system has been developed based on throughput, whereas future communication system will be focused on energy. In particular, as machine-to-machine (M2M) communication, i.e., direction communication mode is developed, it is expected that it is important to efficiently use energy.

Figure 8:
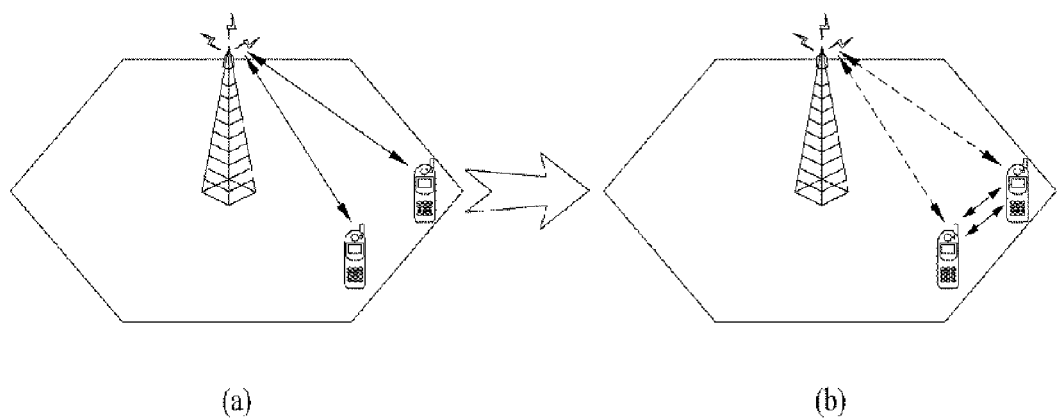
FIG. 8 is a diagram illustrating the difference between a communication method of the related art and M2M communication method.

First of all, the difference between a communication method of the related art and an M2M communication method will be described with reference to FIG. 8. FIG. 8 is a diagram illustrating the difference between a communication method of the related art and an M2M communication method.

Referring to FIG. 8(a), in the communication system according to the related art, the mobile stations always perform communication through the base station. On the other hand, referring to FIG. 8(b), when the mobile stations are located to be locally adjacent to each other, if M2M communication between the mobile stations is available like the case where the channel status between the mobile stations is good, the mobile stations are controlled by the base station, whereas actual data, control information related to data, or network management and control information between the mobile stations is performed by M2M communication between the mobile stations.

In other words, in order to configure a direct link between two or more mobile stations that desire to perform communication, the base station instructs the mobile stations to perform M2M communication between them, actually allocates certain resources for M2M communication between the mobile stations, and notifies the two mobile stations of the allocation. Alternatively, a primary mobile station may be defined such that the base station may transmit and receive related information to and from the primary mobile station only, and M2M communication between the mobile stations may be performed through the primary MS.

The mobile stations directly transmit and receive data to and from each other without through the base station under the instructions of the base station. In this case, although every communication may be performed through M2M communication between the mobile stations, it is preferable that actual data and minimum control information related to the actual data are only transmitted and received between the mobile stations and control information is continuously transmitted and received between the mobile stations and the base station. In other words, M2M communication does not exclude connection and communication with the base station. Namely, M2M communication request and response information, scheduling information (resource allocation information), security information, and information required to perform M2M communication between the mobile stations can be transmitted and received between the mobile stations that perform M2M communication with the base station before M2M communication between the mobile stations. The information required to perform M2M communication between the mobile stations can include information as to what M2M communication method will be used and parameters for M2M communication. Examples of the parameters for M2M communication include physical and MAC layer related parameters such as maximum power, coverage, data rate, modulation and coding scheme (MCS), MIMO scheme/mode, antenna configuration, frame structure, and subframe configuration. Specific control information may be transmitted and received between the base station and the mobile station, if necessary, even during M2M communication between the mobile stations.

Although communication between the mobile stations has been described in the embodiment of the present invention, the present invention is not limited to the communication between the mobile stations. An entity that performs direct communication can include a node such as a relay node, which performs a control function. The entity may be a part of a local network such as nodes having representativity of adhoc network.

Figure 9:
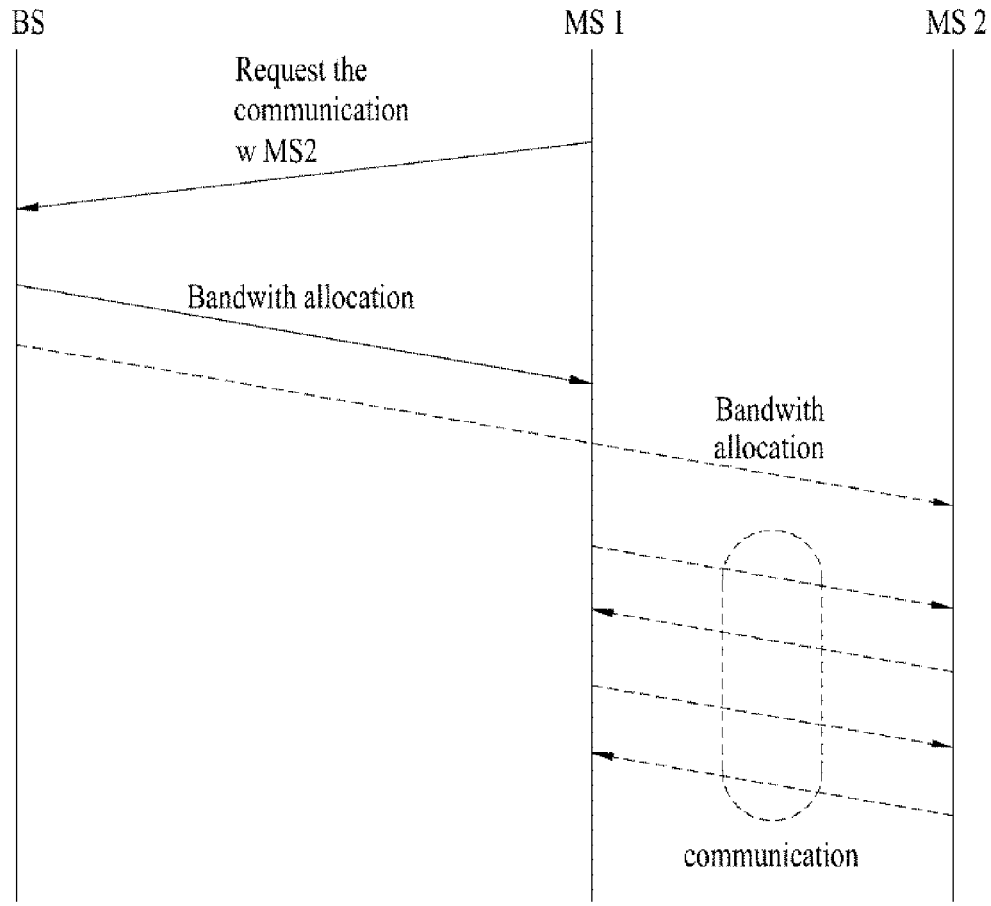
FIG. 9 is a diagram illustrating an example of M2M communication method.

FIG. 9 is a diagram illustrating an example of M2M communication method.

As illustrated in FIG. 9, the mobile station 1 requests the base station of M2M communication with the mobile station 2. Although the mobile station requests the base station of M2M communication in FIG. 9, the base station may request the mobile station to perform M2M communication.

The base station that has been requested M2M communication allocates a resource for M2M communication between the mobile station 1 and the mobile station 2. At this time, the base station may additionally request the mobile station 2 of intention as to whether to perform M2M communication and transmit the result to the mobile station 1. The base station transmits resource allocation information on a resource zone allocated for M2M communication. At this time, the base station may signal the resource allocation information to the mobile station 1 and the mobile station 2, respectively, or may transmit the resource allocation information to the mobile station 1 and the mobile station 2 through common signaling. The resource allocation information may include an indicator for M2M communication, and the base station may allocate a resource for transmitting control information.

Afterwards, the mobile station 1 and the mobile station 2 can mutually perform M2M communication by using the allocated resource while minimizing unnecessary communication with the base station. Communication time and communication order of the mobile station 1 and the mobile station 2 with the base station, time and order of uplink and downlink of the mobile station 1 and the mobile station 2 with the base station, communication time and communication order between the mobile stations, time and order of uplink and downlink between the mobile stations, etc. are briefly illustrated in FIG. 9, and may be varied depending on scheduling of the base station, the status of each mobile station, a transmission rate of each mobile station, etc. The procedure of FIG. 9 is briefly illustrated, and signals such as additional control information and measurement information can be transmitted and received between the mobile station and the base station and between the mobile stations.

Figure 10:
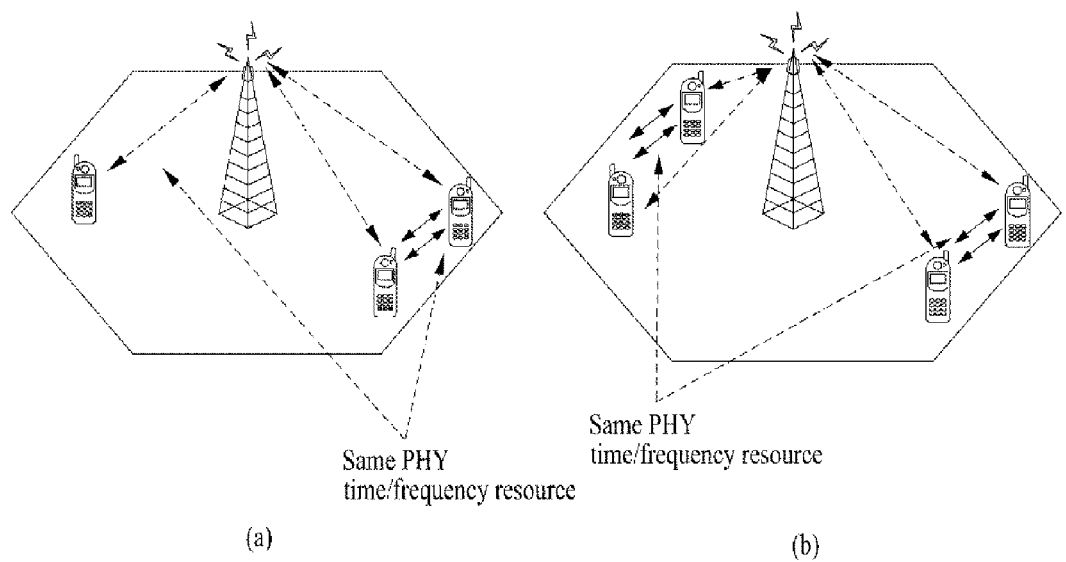
FIG. 10 is a diagram illustrating resource reuse for M2M communication method.

Next, a method for allocating a resource for M2M communication from a base station will be described with reference to FIG. 10.

The resource used for M2M communication may be defined within a bandwidth used between the base station and the mobile station, or may be defined at another bandwidth different from that used between the base station and the mobile station. The bandwidth used between the base station and the mobile station will be referred to as in-band, and the bandwidth different from that used between the base station and the mobile station will be referred to as out-band. The in-band means that the bandwidth includes multi-carriers used between the base station and the mobile station. In other words, a specific multi-carrier can be used for M2M communication.

If the resource used for M2M communication is defined in the out-band, M2M communication may be performed using the existing system or another system. For example, the 802.16m mobile station may be operated at a central frequency different from that of the existing system by using either 802.16m physical layer and MAC layer or system such as WiFi and Zigbee, other than 802.16m. However, if the out-band is used, it is difficult for the base station to efficiently control the out-band.

If the M2M communication is performed in the in-band, a specific part within the bandwidth of the base station is allocated for M2M communication, which will be referred to as resource localization. The resource localization means that the resource for M2M communication is reserved or allocated, but does not mean consecutive physical subcarriers. The resource allocated for M2M communication may be contiguous subcarriers or distributed subcarriers.

At this time, M2M communication performed using the in-band may use the same physical and MAC layer structure as that of the communication system based on the corresponding band, or may define a structure of a new physical and MAC layer for inband M2M communication. Alternatively, a physical and MAC layer structure of the heterogeneous system according to the related art, such as WiFi and Zigbee, may be reused for in-band M2M communication. And, in the in-band M2M communication, the base station can control the mobile station and resources more efficiently.

If the M2M communication is performed in the in-band, resources may be reused. FIG. 10 is a diagram illustrating resource reuse for M2M communication method. FIG. 10(a) illustrates an example that the same physical resource is used for M2M communication and general communication. The base station can reuse the resource allocated for M2M communication for the mobile station, which is located far away from the mobile stations that perform M2M communication, or uses a channel having no relation with the mobile stations that perform M2M communication. Even though the same resource within the cell is repeatedly used, mutual interference may be removed or minimized. In other words, a group of certain communication entities uses a specific resource in a certain physical or logical space, and a group of other communication entities reuses the corresponding resource without any interference. For normal operation of this structure, the base station should involve in mutual action (interference, coordination, etc.) between the groups, or cooperation between communication entity groups should be performed.

FIG. 10(b) illustrates a reuse example of the same physical resource between M2M communications. A resource allocated for specific M2M communication can be reallocated for another M2M communication of mobile stations which are located far away from the mobile stations that perform the specific M2M communication, or have a channel having no relation with the mobile stations that perform the specific M2M communication. Even though the same resource within the cell is repeatedly used, mutual interference may be removed or minimized. The cell can obtain advantages in view of increase of capacity and increase of throughput through resource reuse.

The resource for M2M communication may be used differently from the resource of the related art. Also, the whole structure, such as OFDMA parameters, frame structure, cyclic prefix length, subframe configuration, pilot pattern, and resource allocation unit and method, may newly be configured to be optimized for M2M communication. Another access scheme such as CDMA may be used within the allocated resource. Examples of the resource allocation unit include a physical resource unit, a distributed resource unit, and a contiguous resource unit.

The resource used for M2M communication may be varied depending on the in-band and the out-band. For example, in case of the in-band, transmitting and receiving zones for M2M communication can be defined in uplink resources or downlink resources. Also, the transmitting and receiving zones can be defined in the same resource for communication between the mobile stations. This can occur in both time division duplex (TDD) and frequency division duplex (FDD).

According to the M2M communication method, if a pilot pattern for channel measurement is defined, a pilot pattern of the existing system such as the IEEE 802.16m system can be used. In this case, if the existing pilot pattern is used, unnecessary pilot overhead may occur in view of the M2M communication technology of low mobility. For this reason, a problem occurs that resources for data transmission are wasted.

In this respect, according to the present invention, the existing pilot pattern is corrected, whereby a low density pilot pattern that can minimize unnecessary pilot pattern is defined.

<First Embodiment>

Figure 11:
FIG. 11 is a diagram illustrating a time domain low density pilot pattern for M2M communication according to the first embodiment of the present invention.

FIG. 11 is a diagram illustrating a time domain low density pilot pattern for M2M communication according to the first embodiment of the present invention.

In particular, in the first embodiment, it is considered that the M2M technology is applied to the environment of low mobility as described above, and the location of the pilot RE in the frequency domain is the same location as that of the pilot RE of the pilot pattern of the existing IEEE 802.16m system. In other words, the pilot RE is allocated to the location of the subcarrier corresponding to the pilot pattern of the existing IEEE 802.16m system. However, unlike the pilot pattern allocated per subframe, such as the pilot pattern of the existing IEEE 802.16m system, the pilot RE is partially allocated in the time domain. In this case, the pilot RE can be defined as a low density pilot pattern in the time domain.

In other words, the pilot pattern for M2M communication can be allocated at a specific subframe or frame periodically/non-periodically. Referring to FIG. 11, although the existing pilot pattern is allocated at all subframes, the pilot pattern according to the first embodiment of the present invention is allocated at the first subframe and the third subframe only. Namely, the pilot pattern according to the first embodiment of the present invention is not allocated at the second subframe.

However, if the pilot pattern is partially allocated in the time domain, system throughput may be degraded in some broadcast channel and control channel, which do not support retransmission and need reliability of transmission as important requirements. In this case, the pilot pattern allocation of the present invention is applied to the subframe or frame, at which the specific broadcast channel and control channel are not transmitted. Signaling for the pilot pattern allocation may be broadcasted through system configuration information or unicast mode per mobile station. Alternatively, signaling may be performed in such a manner that the pilot pattern is masked with CRC of the mobile station that supports M2M communication, or that the pilot pattern is scrambled in mobile station ID (STID) or mobile station group ID (cooperative STID or shared STID).

<Second Embodiment>

In the current IEEE 802.16m system, the control channel should be transmitted per subframe. In other words, in the control channel that needs reliability of transmission as important requirements, as described above, it is likely that system throughput may be degraded. Accordingly, the present invention suggests a low density pilot pattern in a frequency domain, which is only useful in a zone that supports M2M communication. In this case, the low density pilot pattern means that a physical resource unit (PRU), to which the pilot pattern is allocated in a PRU unit, is subtracted from a plurality of resource units (PRUs) to which the existing pilot pattern is allocated. Namely, the low density pilot pattern does not mean that the pilot RE allocated in one PRU is subtracted from the plurality of physical resource units.

In this case, the low density pilot pattern for M2M communication is preferably supported in a specific frequency partition or specific frequency band only. The existing pilot pattern is maintained as it is in a frequency partition (or frequency band) other than the specific frequency partition (or the specific frequency band).

Figure 12:
FIG. 12 is a diagram illustrating a frequency domain low density pilot pattern for M2M communication according to the second embodiment of the present invention.

Furthermore, as illustrated in FIG. 12, the low density pilot pattern may be configured in such a manner that the pilot RE allocated in one RRU is subtracted from the plurality of physical resource units.

FIG. 12 is a diagram illustrating a frequency domain low density pilot pattern for M2M communication according to the second embodiment of the present invention. Referring to FIG. 12, the number of pilot REs in one PRU is reduced, and the low density pilot pattern for M2M communication is configured in such a manner that the existing pilot pattern is maintained if possible to minimize configuration complexity under the circumstances that the existing communication method and the M2M communication method should be supported at the same time.

<Third Embodiment>

The third embodiment of the present invention is a combination of the first embodiment and the second embodiment. According to the third embodiment, a specific time-frequency domain for M2M communication is configured, and a low density pilot pattern for M2M communication is defined in such a manner that it is only useful in a time unit (i.e., specific subframe or frame) and a specific frequency band (or frequency partition), whereby data can be transmitted at the other subframes (or frames) and frequency band (or frequency partition) to which the pilot pattern is not allocated. In this way, efficiency in data transmission can be increased.

<Fourth Embodiment>

According to the fourth embodiment of the present invention, a low density pilot pattern for M2M communication is defined through location shift of a pilot RE in a PRU or subframe unit of the existing pilot pattern.

Figure 13:
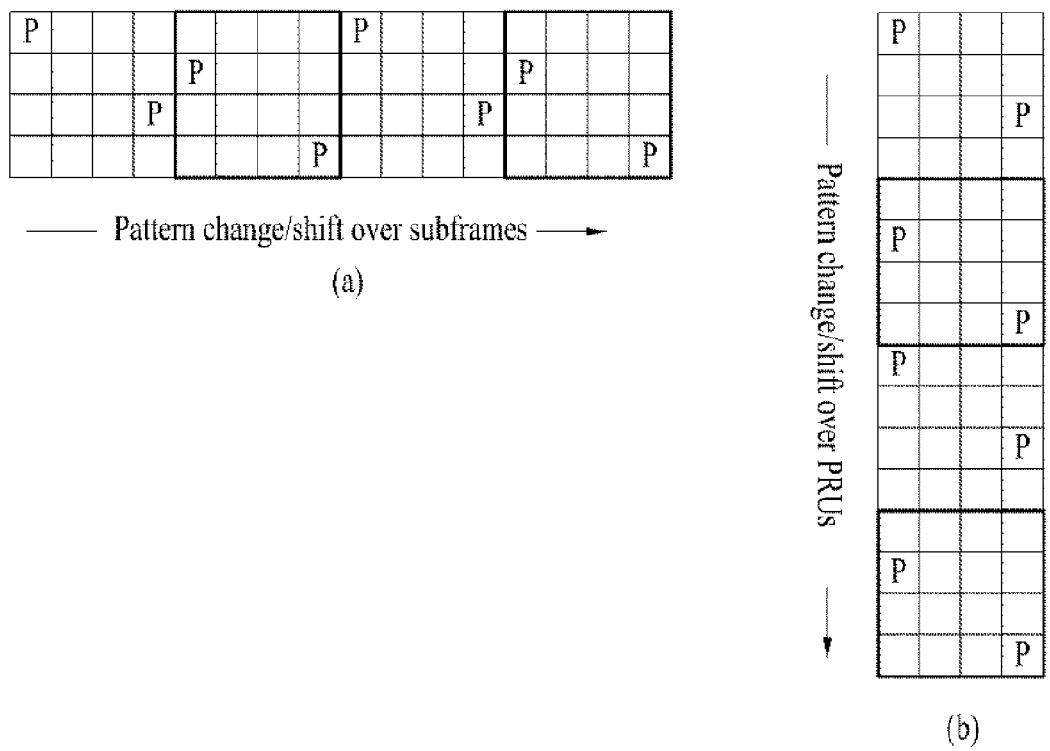
FIG. 13 is a diagram illustrating a 1 Tx or 1 stream low density pilot pattern for M2M communication according to the fourth embodiment of the present invention.

FIG. 13 is a diagram illustrating a 1 Tx or 1 stream low density pilot pattern for M2M communication according to the fourth embodiment of the present invention.

Referring to FIG. 13($a$), the pilot pattern, in which the number of pilot REs is reduced in one PRU as illustrated in FIG. 12, is used as the pilot pattern according to the fourth embodiment of the present invention, and the pilot RE is shifted in a subframe unit. In other words, as the pilot RE is shifted in a subframe unit, the pilot RE can be transmitted for all frequency bands included in one PRU. According to this pilot pattern allocation scheme, it is possible to compensate channel measurement throughput by reducing the number of pilot REs.

Referring to FIG. 13($b$), it is noted that the pilot RE is shifted in a PRU (or subband) unit. The low density pilot pattern may be configured in such a manner that the pilot RE is shifted on both time and frequency axes through combination of (a) and (b) of FIG. 13.

Figure 14:
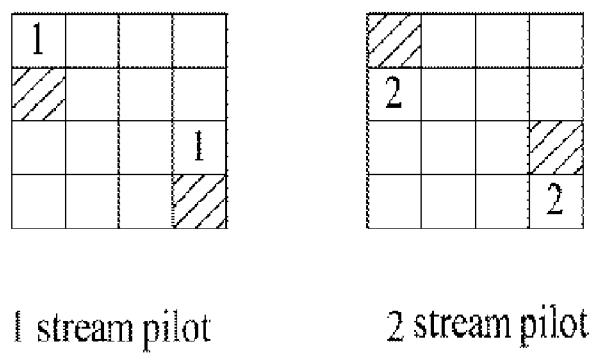
FIG. 14 is a diagram illustrating a 2 Tx or 2 stream pilot pattern in an existing system.

FIG. 14 is a diagram illustrating a 2 Tx or 2 stream pilot pattern in an existing system.

Figure 15A:
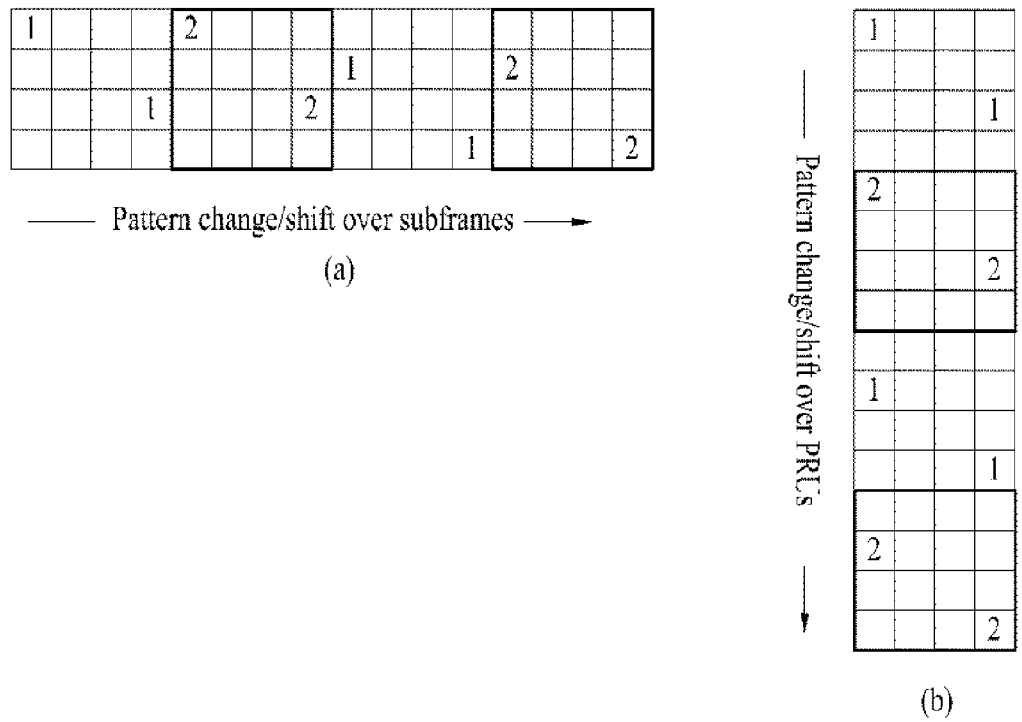
FIG. 15A is a diagram illustrating a 2 Tx or 2 stream low density pilot pattern for M2M communication according to the fourth embodiment of the present invention.
Figure 15B:
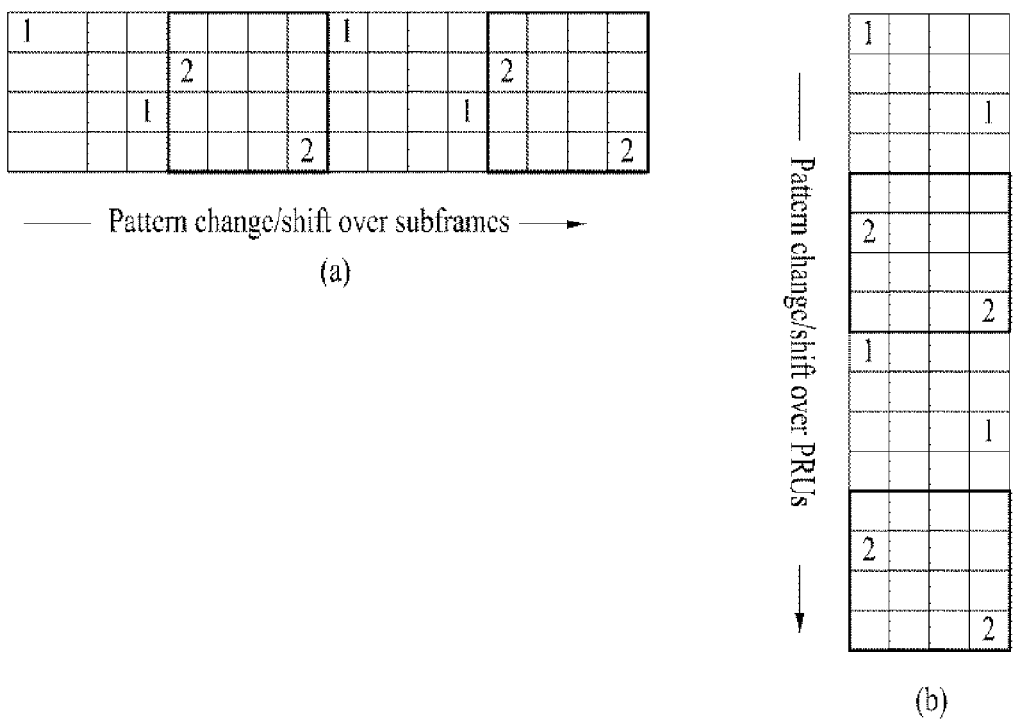
FIG. 15B is another diagram illustrating a 2 Tx or 2 stream low density pilot pattern for M2M communication according to the fourth embodiment of the present invention.

Also, FIG. 15A is a diagram illustrating a 2 Tx or 2 stream low density pilot pattern for M2M communication according to the fourth embodiment of the present invention, and FIG. 15B is another diagram illustrating a 2 Tx or 2 stream low density pilot pattern for M2M communication according to the fourth embodiment of the present invention.

According to the 2 Tx or 2 stream pilot pattern of FIG. 14, during channel measurement per antenna port (or stream), a problem occurs in that pilot allocation location of another antenna port (or stream) should be subjected to nulling. However, according to the 2 Tx or 2 stream low density pilot pattern for M2M communication of FIG. 15, since the pilot RE corresponding to each antenna port (or stream) is transmitted alternately in a subframe unit or PRU (or subband) unit, the pilot RE can be used as data RE without nulling, whereby efficiency in data transmission can be improved.

<Fifth Embodiment>

According to the fifth embodiment of the present invention, puncturing of a symbol unit is applied to the pilot REs included in the existing pilot pattern, whereby a low density pilot pattern is configured. For example, among the pilot REs included in the existing pilot pattern, the pilot REs included in the even (or odd) numbered symbol are transmitted at the even (or odd) numbered subframe. Likewise, among the pilot REs included in the existing pilot pattern, the pilot REs included in the odd (or even) numbered symbol are transmitted at the odd (or even) numbered subframe.

The low density pilot pattern for M2M communication according to the fifth embodiment is to ensure balance between the subframes in view of throughput by allowing each subframe to generate certain pilot overhead. Also, since the existing pilot pattern is used without any change, the configuration of the existing transmitter is changed within the minimum range. Moreover, as the existing interlaced pilot pattern is used without any change, contention, which may occur when M2M communication and the existing wireless communication scheme coexist, can be minimized.

FIG. 16 to FIG. 19 are diagrams illustrating low density pilot patterns for M2M communication according to the fifth embodiment of the present invention.

Figure 16:
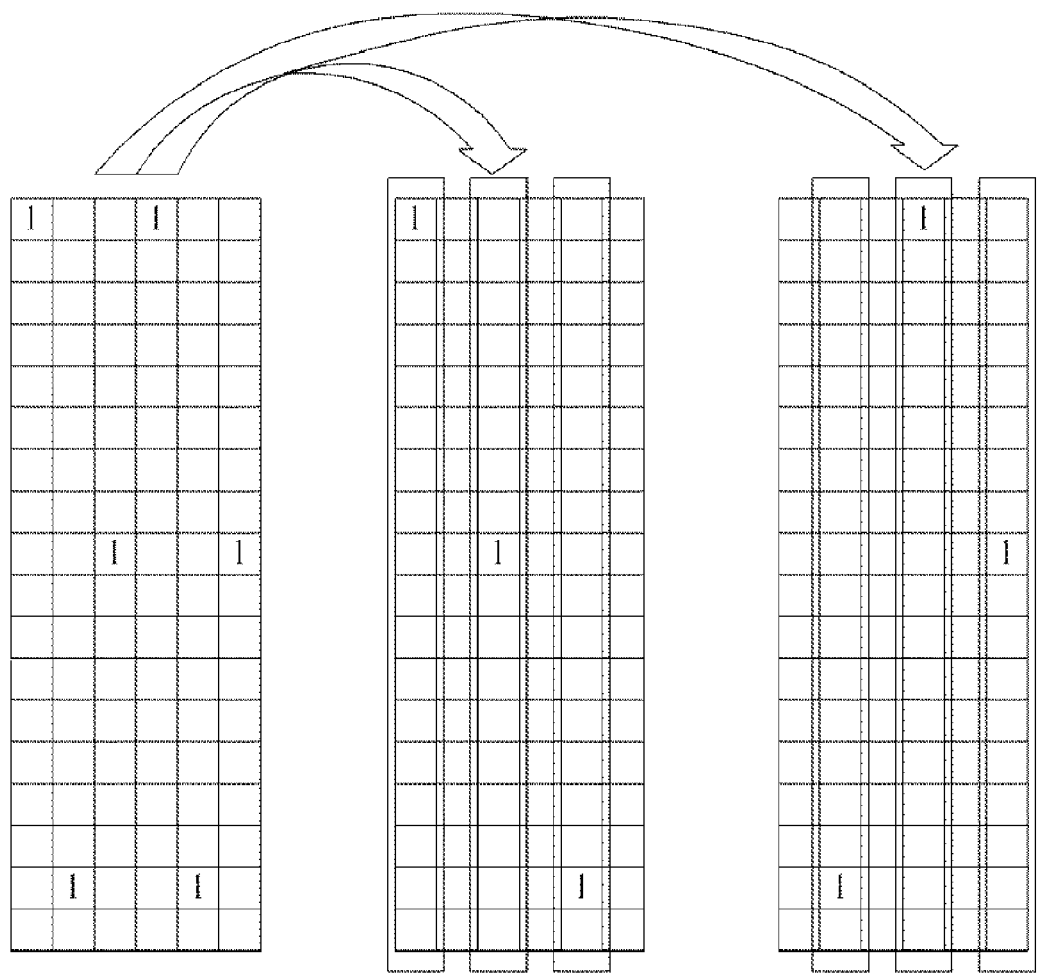
FIG. 16 to FIG. 19 are diagrams illustrating low density pilot patterns for M2M communication according to the fifth embodiment of the present invention.
Figure 17:
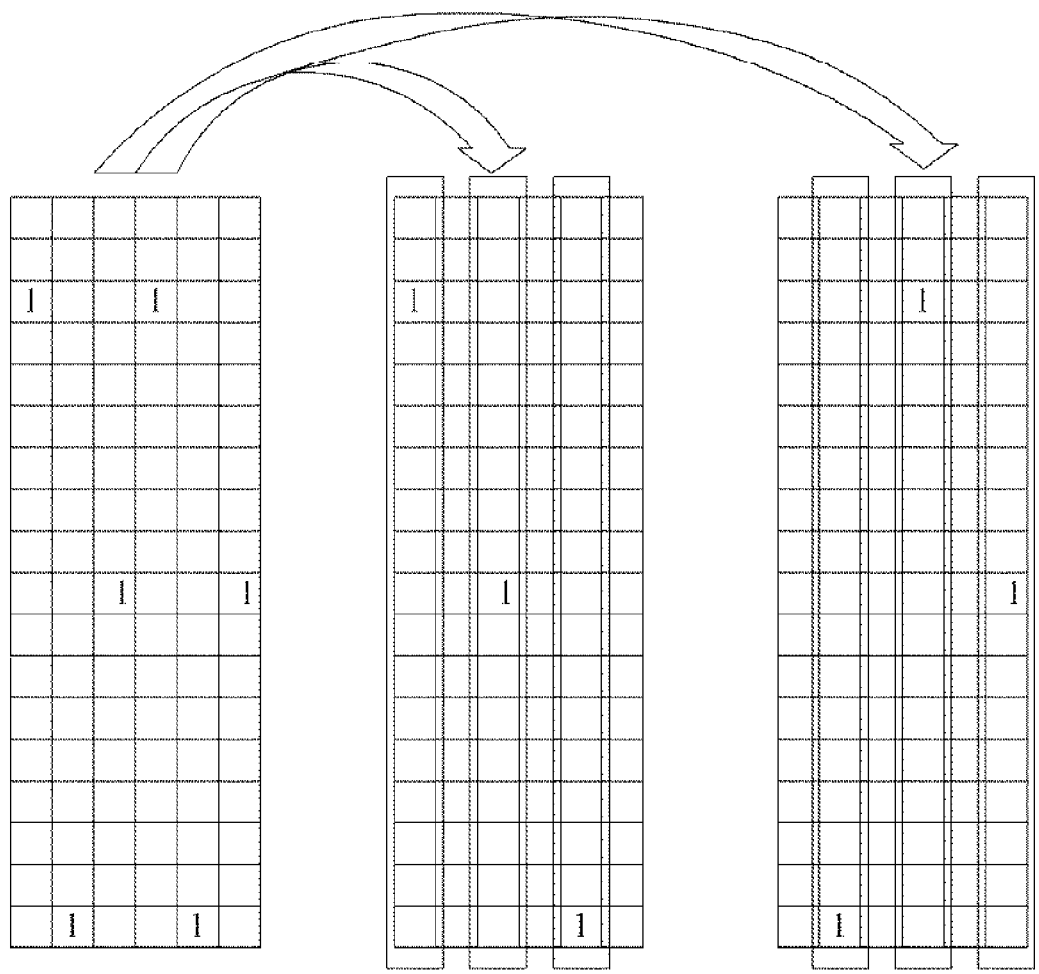

FIG. 16 and FIG. 17 illustrate that pilot REs included in the even numbered symbol of pilot REs included in the existing 1 Tx or 1 stream low density pilot pattern are transmitted at the even numbered subframe, and pilot REs included in the odd numbered symbol are transmitted at the odd numbered subframe.

Figure 18:
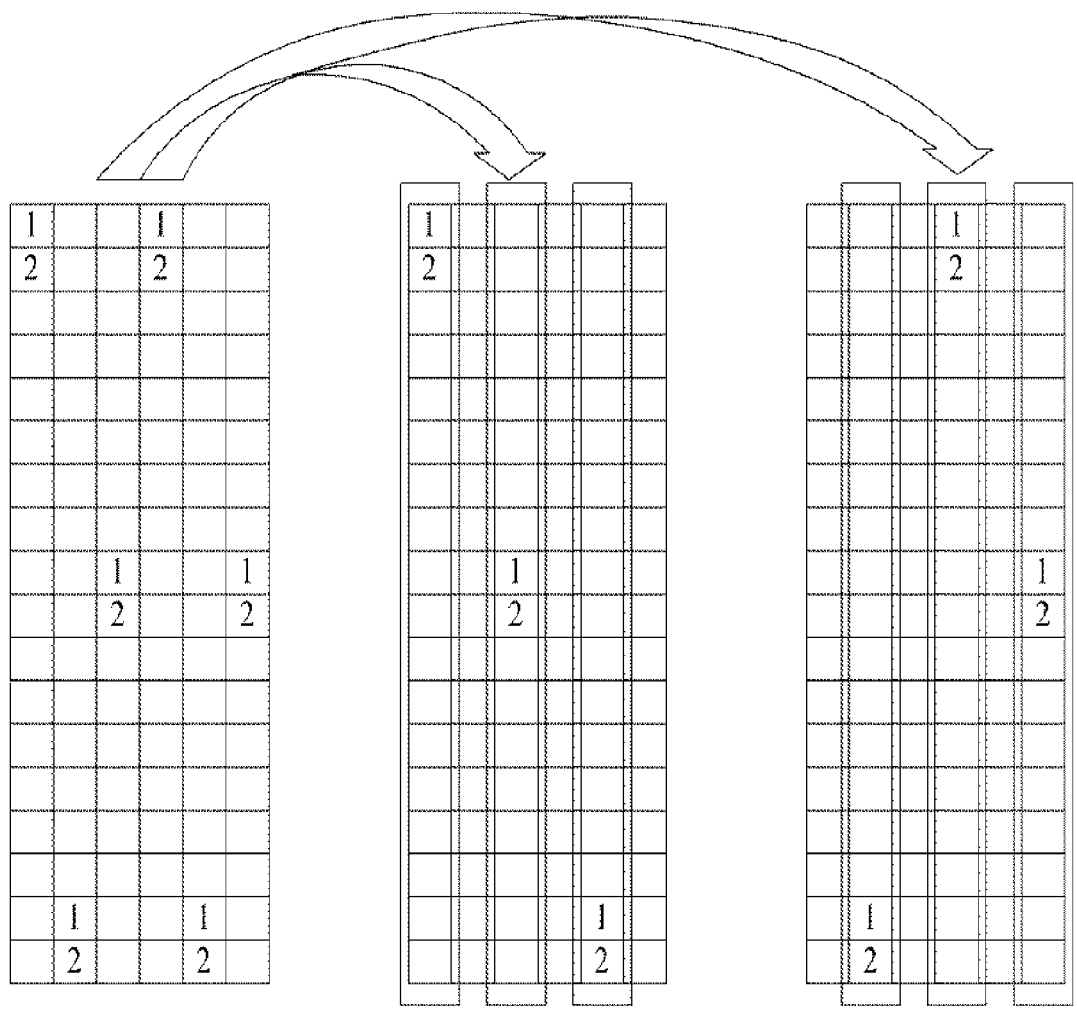

Also, FIG. 18 illustrates that pilot REs included in the even numbered symbol of pilot REs included in the existing 2 Tx or 2 stream low density pilot pattern are transmitted at the even numbered subframe, and pilot REs included in the odd numbered symbol are transmitted at the odd numbered subframe. In particular, a number in each pilot RE of FIG. 18 indicates antenna port (or stream) index.

Figure 19:
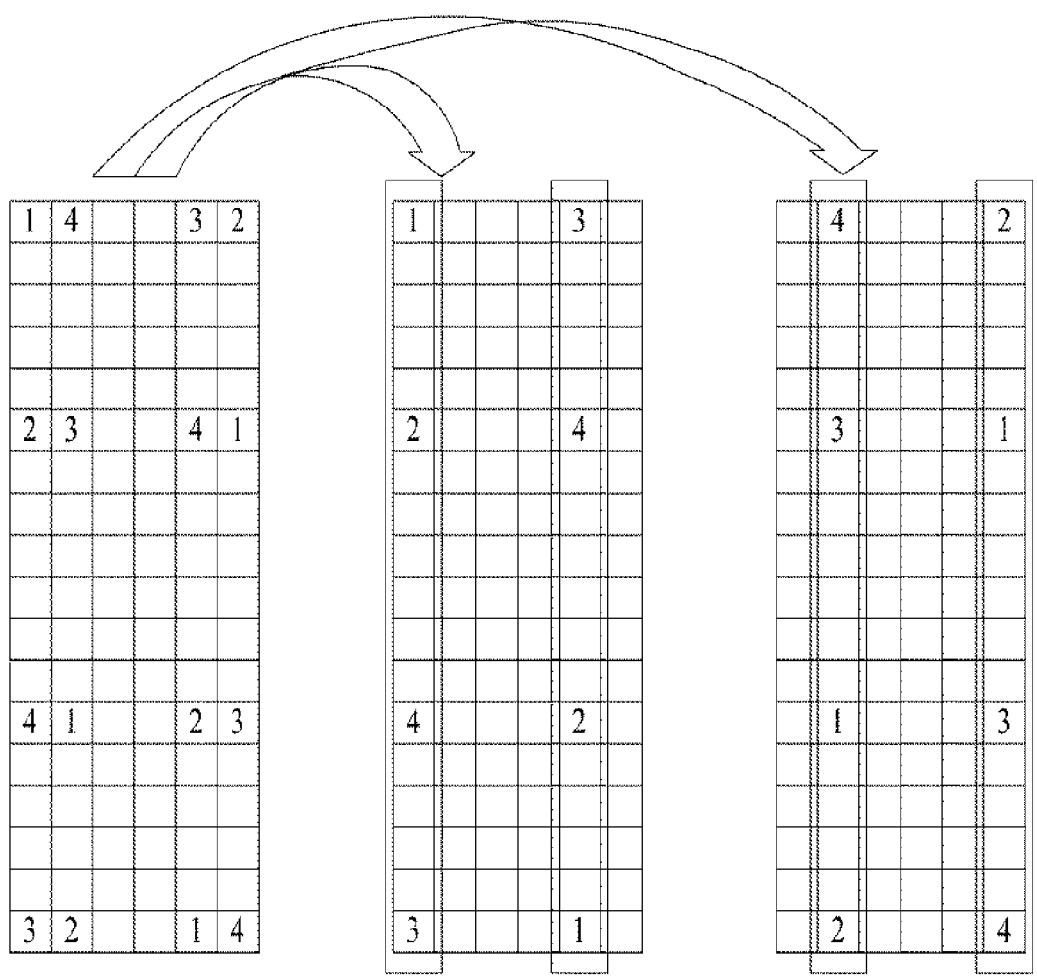

Likewise, FIG. 19 illustrates that a 4 Tx or 4 stream low-density pilot pattern is configured as a low density pilot pattern for M2M communication in accordance with the fifth embodiment of the present invention.

Although the low density pilot pattern is configured in the fifth embodiment in such a manner that puncturing of a symbol unit in a subframe direction is applied to the pilot REs included in the existing pilot pattern, puncturing of a symbol unit in a frequency axis direction, i.e., PRU direction may be applied thereto, or may also be applied in both the subframe direction and the PRU direction.

Figure 20:
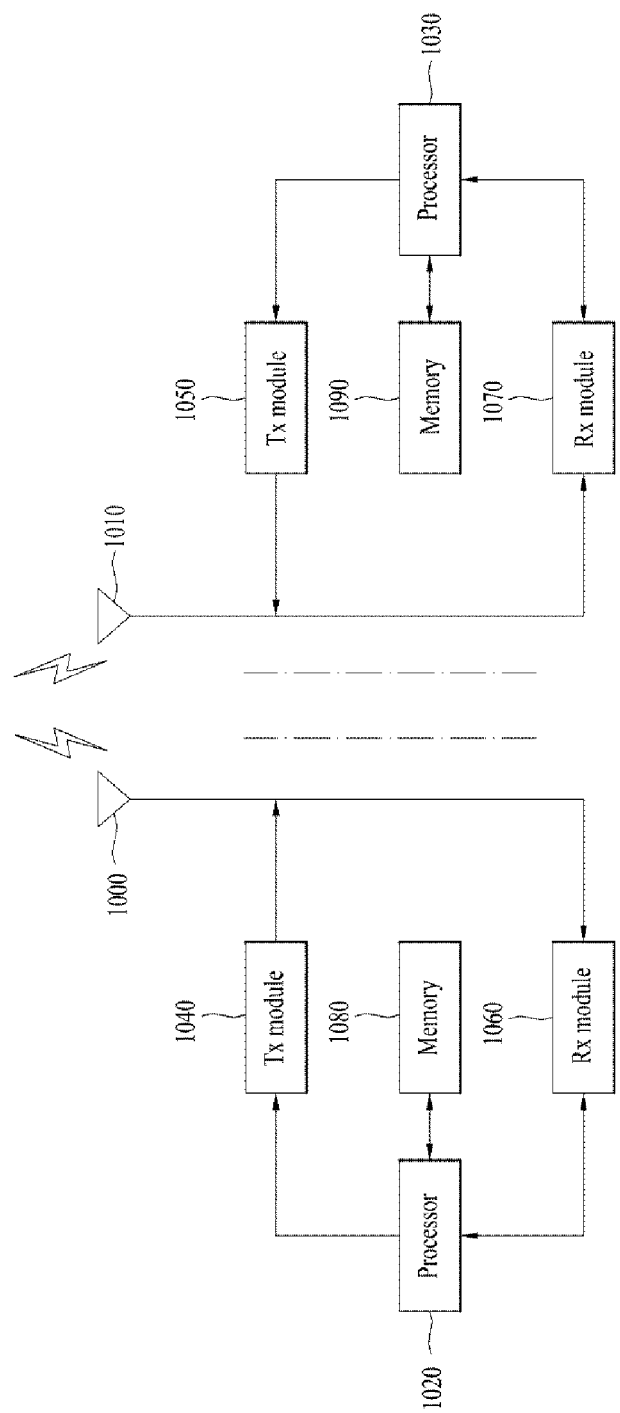
FIG. 20 is a block diagram illustrating a mobile station and a base station through which the embodiments of the present invention can be carried out.

FIG. 20 is a block diagram illustrating a mobile station and a base station, through which the embodiments of the present invention can be carried out.

Each of the mobile station (AMS) and the base station (ABS) includes an antenna 1000, 1010 transmitting and receiving information, data, signal and/or message, a Tx module 1040, 1050 transmitting a message by controlling the antenna, an Rx module 1060, 1070 receiving a message by controlling the antenna, a memory 1080, 1090 storing information related to communication with the base station, and a processor 1020, 1030 controlling the Tx module, the Rx module, and the memory. At this time, the base station could be a femto base station or a macro base station.

The antenna 1000, 1010 serves to transmit a signal generated by the Tx module 1040, 1050 to the outside or receive a radio signal from the outside to transfer the radio signal to the Rx module 1060, 1070. If a MIMO antenna function is supported, two or more antennas may be provided.

The processor 1020, 1030 generally controls the whole operation of the mobile station or the base station. Particularly, the processor can perform a control function for performing the aforementioned embodiments of the present invention, a medium access control (MAC) frame variable control function based on service characteristics and propagation condition, a handover function, an authentication and encryption function, etc. Also, the processor 1020, 1030 further includes an encryption module for controlling encryption of various messages and a timer module controlling transmission and reception of various messages.

The Tx module 1040, 1050 performs predetermined coding and modulation for signal and/or data, which are scheduled from the processor and then transmitted to the outside, and then transfers the coded and modulated data to the antenna 1000, 1010.

The Rx module 1060, 1070 performs decoding and demodulation for the radio signal received from the outside through the antenna 1000, 1010 to recover original data and then transfer the recovered data to the processor 1020, 1030.

The memory 1080, 1090 may store a program for processing and control of the processor, or may perform a function for temporarily storing input/output data (in case of the mobile station, UL grant allocated from the base station, system information, station identifier (STID), flow identifier (FID), action time, zone allocation information, and frame offset information).

Also, the memory can include at least one type of a flash memory type, a hard disk type, a multimedia card micro type, a card type memory (for example, SD or XD memory), a random access memory (RAM), a static random access memory (SRAM), a read-only memory (ROM), an electrically erasable programmable read-only memory (EEPROM), a programmable read-only memory (PROM), a magnetic memory, a magnetic disk, and an optical disk.

The aforementioned embodiments are achieved by combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment. Moreover, it will be apparent that some claims referring to specific claims may be combined with another claims referring to the other claims other than the specific claims to constitute the embodiment or add new claims by means of amendment after the application is filed.

The embodiments of the present invention have been described based on the data transmission and reception between the mobile station and the base station. A specific operation which has been described as being performed by the base station may be performed by an upper node of the base station as the case may be. In other words, it will be apparent that various operations performed for communication with the user equipment in the network which includes a plurality of network nodes along with the base station can be performed by the base station or network nodes other than the base station. The base station may be replaced with terms such as a fixed station, Node B, eNode B (eNB), and access point. The mobile station may be replaced with terms such as user equipment (UE) and mobile subscriber station (MSS).

The embodiments according to the present invention can be implemented by various means, for example, hardware, firmware, software, or their combination. If the embodiment according to the present invention is implemented by hardware, the embodiment of the present invention can be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

If the embodiment according to the present invention is implemented by firmware or software, the embodiment of the present invention can be implemented by a type of a module, a procedure, or a function, which performs functions or operations described as above. A software code may be stored in a memory unit and then may be driven by a processor. The memory unit may be located inside or outside the processor to transmit and receive data to and from the processor through various means which are well known.

It will be apparent to those skilled in the art that the present invention can be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

Industrial Applicability

The present invention can be applied to the wireless communication system. In more detail, the present invention can be applied to a wireless mobile communication apparatus used for a cellular system.

The invention claimed is:

1. A method for transmitting a pilot signal for machine to machine (M2M) communication by a mobile station in a wireless communication system, the method comprising:
configuring a basic unit including a plurality of pilot resource elements (REs) and data resource elements;
allocating pilot signal to the plurality of pilot resource elements in the basic unit; and
transmitting, by a transmitter (Tx), the basic unit in a subframe unit to a receiver in accordance with a rule which is previously defined,
wherein the resource elements are time-frequency resources defined by one symbol index and one subcarrier index,
wherein, when the base unit is transmitted in the subframe, a transmission of a control channel is not allowed in the subframe,
wherein, if the subframe in which the base unit is transmitted is an even numbered subframe, the pilot resource elements included in the even numbered symbol among the pilot resource elements configured in the basic unit are transmitted in the even numbered subframe, and
wherein, if the subframe in which the base unit is transmitted is an odd numbered subframe, the pilot resource elements included in the odd numbered symbol among the pilot resource elements configured in the basic unit are transmitted in the odd numbered subframe.

2. The method of claim 1, wherein information on the subframe at which the basic unit is transmitted is signaled to the transmitter and the receiver by an M2M server.

3. The method of claim 1, wherein the step of transmitting the basic unit includes transmitting the basic unit through a frequency band configured for the M2M communication.

4. A mobile station for machine to machine M2M) communication in a wireless communication system, the mobile station comprising:
a processor configured to:
configure a basic unit including a plurality of pilot resource elements (REs) and data resource elements, and
allocate a pilot signal to the plurality of pilot resource elements in the basic unit; and
a transmitter (Tx) configured to transmit, to a receiver the basic unit in a subframe unit in accordance with a rule which is previously defined,
wherein the resource elements are time-frequency resources defined by one symbol index and one subcarrier index,
wherein, when the base unit is transmitted in the subframe, a transmission of a control channel is not allowed in the subframe,
wherein if the subframe in which the base unit is transmitted is an even numbered subframe, the pilot resource elements included in the even numbered symbol among the pilot resource elements configured in the basic unit are transmitted in the even numbered subframe, and
wherein, if the subframe in which the base unit is transmitted is an odd numbered subframe, the pilot resource elements included in the odd numbered symbol among the pilot resource elements configured in the basic unit are transmitted in the odd numbered subframe.

5. The mobile station of claim 4, wherein information on the subframe at which the basic unit is transmitted is signaled to the transmitter and the receiver by an M2M server.

6. The mobile station of claim 4, wherein the transmitter is further configured to transmit the basic unit through a frequency band configured for the M2M communication.

* * * * *